US008635132B1

(12) United States Patent
Wilks et al.

(10) Patent No.: US 8,635,132 B1
(45) Date of Patent: Jan. 21, 2014

(54) SELF-SERVICE REAL-TIME FINANCIAL ADVICE

(75) Inventors: Bruce Wesley Wilks, San Antonio, TX (US); Robert Morales, Helotes, TX (US); Rennie Garcia, Helotes, TX (US); Robert Anthony Pacheco, San Antonio, TX (US)

(73) Assignee: United Services Automobile Associatiion (USAA), San Antonio, TX (US)

( * ) Notice: Subject to any disclaimer, the term of this patent is extended or adjusted under 35 U.S.C. 154(b) by 0 days.

(21) Appl. No.: 12/102,108

(22) Filed: Apr. 14, 2008

(51) Int. Cl.
*G06Q 40/00* (2012.01)

(52) U.S. Cl.
USPC .......................................... 705/35; 709/224

(58) Field of Classification Search
USPC ............................................. 705/35; 707/14
See application file for complete search history.

(56) References Cited

U.S. PATENT DOCUMENTS

| | | | | |
|---|---|---|---|---|
| 6,012,044 | A * | 1/2000 | Maggioncalda et al. | 705/36 R |
| 6,021,397 | A | 2/2000 | Jones et al. | |
| 6,253,192 | B1 | 6/2001 | Corlett et al. | |
| 6,430,542 | B1 * | 8/2002 | Moran | 705/36 R |
| 6,633,910 | B1 | 10/2003 | Rajan et al. | |
| 6,859,788 | B1 * | 2/2005 | Davey | 705/36 R |
| 6,947,904 | B1 * | 9/2005 | Macey | 705/36 R |
| 6,985,880 | B1 * | 1/2006 | Hodgdon et al. | 705/36 T |
| 7,292,996 | B2 * | 11/2007 | Nobrega et al. | 705/39 |
| 7,321,874 | B2 | 1/2008 | Dilip et al. | |
| 7,512,829 | B2 | 3/2009 | Mital et al. | |
| 7,590,589 | B2 * | 9/2009 | Hoffberg | 705/37 |
| 7,603,306 | B2 * | 10/2009 | Macey | 705/35 |
| 7,617,138 | B1 * | 11/2009 | Gladden et al. | 705/30 |
| 7,966,246 | B2 * | 6/2011 | Ingargiola et al. | 705/37 |
| 2001/0056391 | A1 * | 12/2001 | Schultz | 705/36 |
| 2002/0073005 | A1 * | 6/2002 | Welnicki et al. | 705/35 |
| 2002/0095363 | A1 | 7/2002 | Sloan et al. | |
| 2002/0107791 | A1 * | 8/2002 | Nobrega et al. | 705/39 |
| 2002/0111890 | A1 * | 8/2002 | Sloan et al. | 705/36 |
| 2004/0054610 | A1 * | 3/2004 | Amstutz et al. | 705/36 |
| 2004/0078464 | A1 * | 4/2004 | Rajan et al. | 709/224 |
| 2005/0090911 | A1 * | 4/2005 | Ingargiola et al. | 700/36 |
| 2005/0144108 | A1 | 6/2005 | Loeper | |
| 2006/0010061 | A1 * | 1/2006 | Macey | 705/35 |
| 2006/0074788 | A1 * | 4/2006 | Grizack et al. | 705/35 |
| 2006/0165060 | A1 * | 7/2006 | Dua | 370/352 |
| 2006/0167784 | A1 * | 7/2006 | Hoffberg | 705/37 |
| 2006/0241989 | A1 * | 10/2006 | Walters et al. | 705/7 |
| 2007/0027736 | A1 * | 2/2007 | Reynolds et al. | 705/8 |
| 2007/0087756 | A1 * | 4/2007 | Hoffberg | 455/450 |

(Continued)

OTHER PUBLICATIONS www.oed.com (Monitor).*

(Continued)

*Primary Examiner* — Chika Ojiaku
(74) *Attorney, Agent, or Firm* — Kilpatrick Townsend & Stockton LLP

(57) ABSTRACT

A user may obtain self-service financial planning. A comprehensive set of data pertaining to a user is gathered from various sources and analyzed to generate a financial plan. A user may be presented with various financial scenarios based on information provided by the user. The user may perform "what if" analyses to determine prospective financial plans and results based on hypothetical information that the user may provide. A user may be provided with a financial plan and the user may see how the plan changes under various risk tolerances and life event scenarios.

17 Claims, 6 Drawing Sheets

(56) References Cited

U.S. PATENT DOCUMENTS

| | | | | |
|---|---|---|---|---|
| 2007/0143083 | A1* | 6/2007 | Kropaczek et al. | 703/2 |
| 2008/0154792 | A1* | 6/2008 | Maggioncalda et al. | 705/36 R |
| 2008/0201269 | A1* | 8/2008 | Hollins et al. | 705/36 R |
| 2008/0243716 | A1* | 10/2008 | Ouimet et al. | 705/36 R |
| 2010/0121780 | A1 | 5/2010 | Sheridan | |
| 2011/0087622 | A1* | 4/2011 | Padgette et al. | 705/36 R |

OTHER PUBLICATIONS

Madnick, Stuart and Siegel, Michael; "Seizing the Opportunity: Exploiting Web Aggregation"; MIT Sloan Working Paper No. 4351-01; Dec. 2001; pp. 1-15.

Teknowledge Corporation; "Tekportal Account Aggregation"; [Retrieved on Jan. 28, 2008]; Retrieved from the internet <URL:http://www.teknowledge.com/fs/tekportal/aggregation.htm>.

Schmerken, Ivy—"Advisors Tool Up for Wealth Management—The Big Picture", Wall Street & Technology, Apr. 8, 2002, pp. 1-7, Copyright® 2008 United Business Media LLC.

Moving.com, "Home & Garden Tips—Interview with a Financial Planner", Retrieved from the internet <http://www.moving.com/Mortgage_and_Finance/MAI_Article/FinancialPlanner.asp>, pp. 1-3, Copyright © 2000-2008 Move, Inc.

MWBoone and Associates, "MWBoone & Associate's WealthVision"; Retrieved from the Internet <URL: http://store.mwboone.com/mwwe.html>, Copyright © 2007 MWBoone and Associates All Rights Reserved.

Whiting, Rick; "Moving Closer to Real-Time Financial Planning—Adaytum and Comshare emphasize collaboration in new financial-planning applications." InformationWeek, May 13, 2002 12:00 AM. Copyright © 2007 CMP Media LLC.

First Allied, "Technology—Innovative Technology; iStation: Intelligence at Work", Retrieved from the internet <URL:http://www.joinfasi.com/technology.php>. © 2008 Advanced Equities, Inc.

Matthews, Jayson, "Real Time Financial Planning"; siliconvalley.internet.com, Nov. 8, 2000. Retrieved from the internet <URL: http://siliconvalley.internet.com/news/article.php/506771>. Copyright 2008 Jupitermedia Corporation All Rights Reserved.

Tycor Companies, "Cover Story—The Tycor Companies—Tycor Benefit Administrators, Inc. and Tycor Asset Management, Inc.(r)." Retrieved from the internet <URL: http://www2.422business.com/articles/200512/TheTycorCompan.html>.

Kim, Jinhee; "The Effected of Workplace Financial Education on Personal Finances and Work Outcomes, Chapter II. Review of Related Literature"; Apr., 2000; pp. 13-103; Blacksburg, Virginia.

Bae, Sung C. and Sandager, James P.; "What Consumers Look for in Financial Planners"; Financial Counseling and Planning; 1997; pp. 9-16; vol. 8, Issue 2.

Rojas, Stephen J.; "Developing a Basis for Personal Financial Planning Recommendations: The CPAs' Responsibilities"; pp. 1-3.

Four Seasons Financial Planning; "About Us"; [Retrieved on Jan. 28, 2008]; Retrieved from the internet <URL:http://www.fourseasonsfp.co.uk/aboutus.asp>.

Folk Financial Planning; "Financial Planning"; [Retrieved on Jan. 28, 2008]; Retrieved from the Internet <URL:http://www.karenfolk.com/#planning>.

O'Neill, Barbara O'Neill, Xiao, Jing J., Bristow, Barbara, Brennan, Patricia Brennan and Kerbel, Claudia M.; "Successful Financial Goal Attainment: Perceived Resources and Obstacles"; Financial Counseling and Planning; 2000; pp. 1-12; vol. 11, Issue 1.

Rojas, Stephen J.; "Putting Financial Strategies into Action: Implementing, Monitoring and Updating a Client's Personal Financial Planning Strategies"; pp. 1-7.

Kozak Financial Advisory; "Our Services"; [Retrieved on Jan. 28, 2008]; Retrieved from the internet <URL:http://www.kozakfinancial.com/whatwedo.asp?SPID=57313&Title=Our+Services&OrgID=1914>.

MBA Services Financial Planning; "Introduction to Financial Planning: It is a journey, not a destination."; [Retrieved on Jan. 28, 2008]; Retrieved from the internet <URL:http://www.medicalbusinessadvisors.com/services-financial.asp>; Medical Business Advisors, Inc.; Atlanta, Georgia.

Ten Haagen Financial Group; "Published Articles: The Importance of a Financial Checkup"; [Retrieved on Jan. 28, 2008]; Retrieved from the Internet <URL:http://www.tenhaagen.com/section4.cfm>.

Lapide, Larry, "Sales and Operations Planning Part II: Enabling Technology"—The Journal of Business Forecasting, Winter 2004-05. 3 pages (pp. 18-20).

Oracle, "Oracle and Hyperion", Retrieved from the internet <http://www.oracle.com/hyperion/index.html>, pp. 1-4, Oracle Corporation.

Mr. Dashboard—business metrics, Retrieved from the internet <http://www.mrdashboard.com>, Copyright 2007 Mr. Dashboard. All rights reserved.

Budgets Get Real—personal money management software, Retrieved from the internet <http://budgetsgetreal.com/>, pp. 1-5, © 2005-2007 Informed Choices Pty Ltd.

Paradigm Analytics—The ability to solve for X, Business Intelligence and Performance Management, Retrieved from the internet: <http://www.paradigmanalytics.com/>.

* cited by examiner

SELF-SERVICE REAL-TIME FINANCIAL ADVICE

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/102,111, and U.S. patent application Ser. No. 12/102,115, each filed on Apr. 14, 2008 and each entitled "Self-Service Real-Time Financial Advice."

BACKGROUND

Financial planners try to determine how their clients can meet financial goals through management of resources. They examine the financial history of their client's assets and develop a financial plan the client should take to meet their goals. The financial plan is based on a client's financial situation at one point in time. However, financial planning is data-heavy that constantly changes. Financial planners are not able to continuously monitor a client's financial situation and revise the financial plan accordingly. Delays in receiving updated client data lead to delays in revising financial plans.

Additionally, a financial plan is often generated and provided using a limited set of data that is often not up-to-date. Such limited data leads to inaccurate or inappropriate financial plans.

SUMMARY

A user may obtain self-service financial planning. A comprehensive set of data pertaining to a user is gathered from various sources and analyzed. A financial plan, comprising financial advice and/or recommendations for example, is generated and provided to the user.

In an implementation, a user may be presented with various financial scenarios based on information provided by the user. "What if" analyses may be performed to determine prospective financial plans and results based on hypothetical information that the user may provide. A user may be provided with a financial plan and the user may see how the plan changes under various risk tolerances and life event scenarios.

In an implementation, a user's actions over time may be monitored to determine how a user's risk tolerance and other factors that may be used in the generation of a financial plan for the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
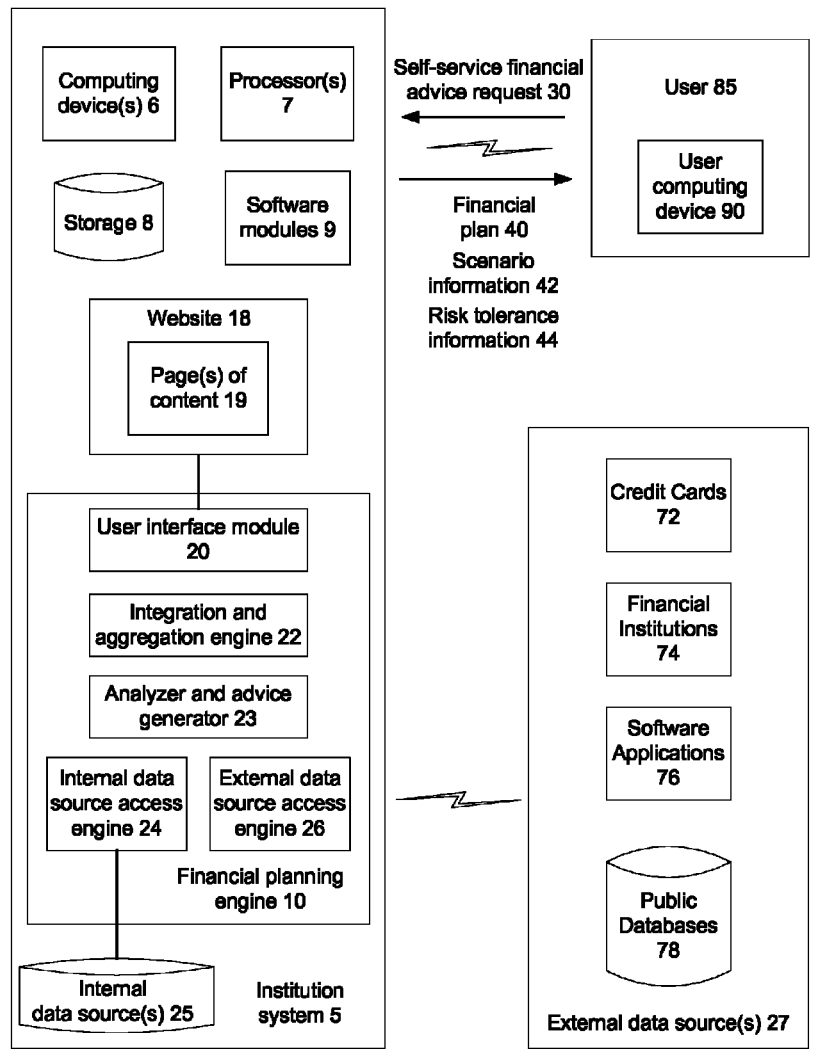
FIG. 1 is a block diagram of an implementation of a system that may be used to provide self-service financial advice.

FIG. 1 is a block diagram of an implementation of a system that may be used to provide self-service financial advice. An institution system 5, associated with or otherwise maintained by an institution such as a financial services institution, may include a financial planning engine 10. The financial planning engine 10 may receive a self-service financial advice request 30 from a user 85 via a user computing device 90, and may provide a financial plan 40, comprising financial advice and/or recommendations for example, to the user 85 via the user computing device 90. The financial plan may be generated and provided to the user without any involvement of a human financial planner or representative of the institution that maintains the institution system 5. An example user computing device 90 is described with respect to FIG. 6.

The financial planning engine 10 may also generate and provide scenario information 42 and risk tolerance information 44 to the user 85 via the user computing device 90. Scenario information 42 refers to information pertaining to various hypothetical scenarios involving the user, such as various life events (e.g., having a child, getting married, etc.) and financial actions (e.g., paying off credit card debt, retiring at age 60, paying for a child's college education, etc.). Risk tolerance information 44 refers to information that the institution system may determine that is directed to the user's tolerance for risk, based on the user's actions over time and other factors.

The financial planning engine 10 may include a user interface module 20, an integration and aggregation engine 22, an analyzer and advice generator 23, an internal data source access engine 24, and an external data source access engine 26. The user interface module 20 may generate and format one or more pages of content 19 as a unified graphical presentation that may be provided to the user computing device 90 as an output from the financial planning engine 10. The page(s) of content 19 may be provided to the user computing device 90 via a website 18 associated with the institution system 5.

The financial planning engine 10 has access to data pertaining to the user 85, including data that is currently stored by the institution that maintains the financial planning engine 10 as well as a user's external accounts. The integration and aggregation engine 22 provides the financial planning engine 10 the ability to retrieve information from one or more internal data sources 25 and one or more external data sources 27 concurrently, in an implementation, via an internal data source access engine 24 and an external data source access engine 26, respectively. Data pertaining to the user 85 may be retrieved from internal source(s) 25 as well as external data source(s) 27. The retrieved data may be stored centrally, perhaps in storage associated with the institution system 5, such as storage 8.

Internal data source(s) 25 may contain data that the institution system 5 maintains pertaining to the user 85, such as personal data such as marital status and age, as well as financial data such as account balances, outstanding loans, credit card debt, etc. For instance, the user 85 may have a checking account, a credit card, and an auto loan with the institution system 5, and this information may be retrieved and used by the financial planning engine 10.

External data source(s) 27 may contain additional data pertaining to the user, such as additional personal data and/or financial data. External data source(s) 27 may be associated with one or more entities that may be independent of each other. Each of the external data source(s) 27 may be a computer system that maintains financial information or financial accounts of the user 85 that is not maintained by the institution system 5. It is contemplated that any number of external data sources may be in communication with the institution system 5 and may provide any type of data associated with users thereto.

Various external data sources 27 are shown, such as credit cards 72, financial institutions 74, financial software applications 76, and public databases 78. The external data source(s) 27 may be in communication with the institution system 5 via a network, such as the Internet. Additional example sources of data may include bank accounts, retirement accounts, brokerage accounts, mutual funds, annuities, certificates of deposits, and investment accounts, for example, along with publicly available information. For example, data from investment and retirement accounts might include mutual funds, bonds, etc. and may be acquired and used in financial planning.

The integration and aggregation engine 22 may receive user information from the internal and external data source access engines 24 and 26 and may provide that information to the analyzer and advice generator 23. Via the internal and external data source access engines 24 and 26, in an implementation, the integration and aggregation engine 22 may receive user data from the various external data sources 27, as well as the internal data source(s) 25 (which may contain previously retrieved data and/or data that is hosted by the institution) and may provide that information to the analyzer and advice generator 23.

The user data may be contained within a host financial institution (e.g., the institution that maintains or uses the financial planning engine 10), or contained in external institutions, for example. The received user data may also be stored in internal data source(s) 25. Data that is aggregated may include income, expenses, assets, risk profile, risk tolerance, and plan horizon, for example. Additionally, data from investment and retirement accounts that might include mutual funds, bonds, etc. may be acquired, aggregated, and used in the financial planning. In this manner, a more complete set of a user's assets and liabilities may be used for financial planning determination. So, for example, spending and income from relevant areas may be retrieved, stored, and analyzed for financial planning.

A user may provide access to this data with the host financial institution prior to the financial plan being generated (or after the financial plan has been generated in order to provide additional data for a revised financial plan). The access may be granted by providing the appropriate credentials for the external accounts to the host institution that is generating the financial plan. The access may be one-time, persistent, or for a limited duration (e.g., 6 months), for example. The aggregated data may be stored in internal data source(s) 25 for example, and may be automatically updated periodically, if access to the external data may still be obtained.

The external data items may be retrieved ("screen scraped") through private third party websites (e.g., websites associated with credit cards 72 and financial institutions 74) if the user has provided permission and proper credentials for accessing such private third party websites. Publicly available data might include data acquired from sites and resources such as the stock market, government pages that publish inflation rates, and other items that might be used in financial planning, for example. Screen scraping is well known, and it is contemplated that any appropriate screen scraping product or technique may be used.

After retrieving and storing the data from the various sources, the analyzer and advice generator 23 may use tools, calculators, applications, and aggregators, for example to generate a financial plan 40, scenario information 42, and/or risk tolerance information 44. Or alternatively, the analyzer and advice generator 23 may access the external data from the source(s) in direct response to the user request for financial advice. Because the access had previously been granted, the analyzer and advice generator 23 may extract the data for the analysis based on the access.

In an implementation, the analyzer and advice generator 23 may include one or more of a portfolio planner, a financial assessment tool, a budget generating tool, an asset allocation tool, a life insurance determination calculator, a retirement advice generator, bank calculators, debt analyzers, retirement income planners, etc. The analyzer and advice generator 23 may evaluate the user information (e.g., the personal information and the financial information pertaining to the user) and generate a financial plan 40 that may comprise financial advice and/or recommendations for the user 85. Scenario information 42 and risk tolerance information 44 may also be generated.

In an implementation, after the external data is acquired, it may be used to pre-fill or personalize certain portions of a questionnaire that may be provided to a user to request additional information that may be useful for generating a financial plan, scenario information, and/or risk tolerance information. The fields or items remaining without user data after the pre-filling or personalization may then be identified and brought to the user's attention, e.g., by highlighting these items on the user computing device 90 or by using another identifying mechanism to show the user what information is still needed. This information, if any, may then be manually provided by the user 85. Additionally or alternatively, additional information may be requested from the user to further refine an already generated financial plan, scenario information, and/or risk tolerance information. The external data may be stored in the internal data source(s) 25 after it is acquired.

In an implementation, the financial plan 40, the scenario information 42, and/or the risk tolerance information 44, along with any financial advice and recommendations, may be integrated into a single unified presentation, which may then be sent to the user interface module 20 for presentation to the user 85. Through this mechanism, the user 85 may quickly see the financial plan 40, the scenario information 42, and/or the risk tolerance information 44 that have been generated for them. Thus, in an implementation, a financial plan 40 may be provided online, e.g. via the website 18, to the user 85 and as described further herein, may be updated continuously or periodically by the institution system 5. Scenario information 42 and risk tolerance information 44 may also be provided online to the user.

The user 85 may interface with the institution system 5 via the website 18 that may display one or more pages of content 19 to the user 85 on the user computing device 90. A self-service financial advice request 30 may be received at the institution system 5 through any suitable means, such as interaction with a web browser that is in communication with a financial advice server or other computing device within the institution system 5. The actual mechanism of connection is outside the scope of the present discussion.

The self-service financial advice request 30 may be processed by the financial planning engine 10, which then provides the user 85 with a financial plan 40 or other information such as scenario information 42 and/or the risk tolerance information 44.

In an implementation, the user 85 may be provided with advice, recommendations and/or a plan directed to asset management, estate planning, insurance, investments, and retirement, for example. The financial plan 40 may comprise a set of recommendations and strategies for the user 85 to use. For example, recommendations and strategies may be provided that are directed to income in retirement, income for shortfall or surplus, income distribution, pre-retirement savings, asset allocation recommendations, asset withdrawal strategies, and recommendations for re-allocation from wealth building to income generating. Additionally, specific product recommendations may be provided along with a list of suitable products for user consideration, for example.

The financial plan 40 may also comprise a financial profile for the user 85 who may use it to create and maintain financial information about the user 85. The financial profile may include income, assets, liabilities, and social security and pension information, for example. The institution system 5 may continuously (on a real-time basis) or periodically (repeatedly over a period of time) monitor the user's data, the financial profile, and the user's implementation of recommendations set forth in the financial plan 40, and revise the financial plan 40 and risk tolerance information 44 accordingly. In an implementation, scenario information 42 may be revised. In this manner, real-time or periodic updates to the financial plan 40, scenario information 42, and/or risk tolerance information 44 may be provided to the user 85.

The financial planning engine 10 may provide a questionnaire to the user 85 that requests information from the user 85 such as financial objectives, current income, investments, risk tolerance, expenses, tax returns, insurance coverage, retirement programs, estate plans, and other pertinent information that may be used to generate a financial plan 40 that meets the user's overall or specific financial agenda. The questionnaire may be pre-filled or personalized with data already known to the institution system 5 pertaining to the user 85, perhaps from existing accounts that the user has with the institution system 5. The institution system 5 may generate a financial plan 40 based at least in part on the questionnaire. The questionnaire may also be used in the determination of scenario information 42 and risk tolerance information 44.

The user computing device 90 may provide user access to a system which is coupled to the financial planning engine 10 and is configured to receive a plurality of user requests, at least one of which is a financial advice request 30. A system may be configured to format and transmit a graphical user interface to user 85, and through the graphical user interface provide the user 85 the ability to interact with and manipulate the financial advice, recommendations, and/or financial plan provided by the institution system 5.

A user access system may be communicatively coupled to the financial planning engine 10 and may be configured to send machine-readable instructions to the financial planning engine 10. Those instructions may cause the financial planning engine 10 to access one or more internal and one or more external data sources 25 and 27, respectively.

As mentioned above, the financial planning engine 10 may provide a unified graphical presentation output. The unified graphical presentation may be transmitted to the user access system. In an implementation, the unified graphical presentation is combined with other materials and transmitted to the user 85. In an implementation, the unified graphical presentation is received by the user access system and transmitted directly to the user 85 without the inclusion of any other materials.

The user access system may be implemented as a web server in an implementation. The user access system, through the use of any suitable interactive web technology, provides an interactive experience to the user 85 through which access to and maintenance of their financial advice, recommendations, scenario information, risk tolerance information, and/or financial plan can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the institution may be a financial services institution having a financial services website. On the website, in a common space, the user may be presented with financial advice, recommendations, scenario information, risk tolerance information, and/or a financial plan.

The institution system 5 may comprise one or more computing devices 6. A user computing device 90 may allow a user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user 85 may be stored in storage 8 or other storage such as one or more internal data sources 25, for example.

Examples of software modules 9 may include modules for identifying and authenticating a user, generating a questionnaire, acquiring and aggregating user data, analyzing user data, generating web page content for display, and receiving instructions from a user, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 2:
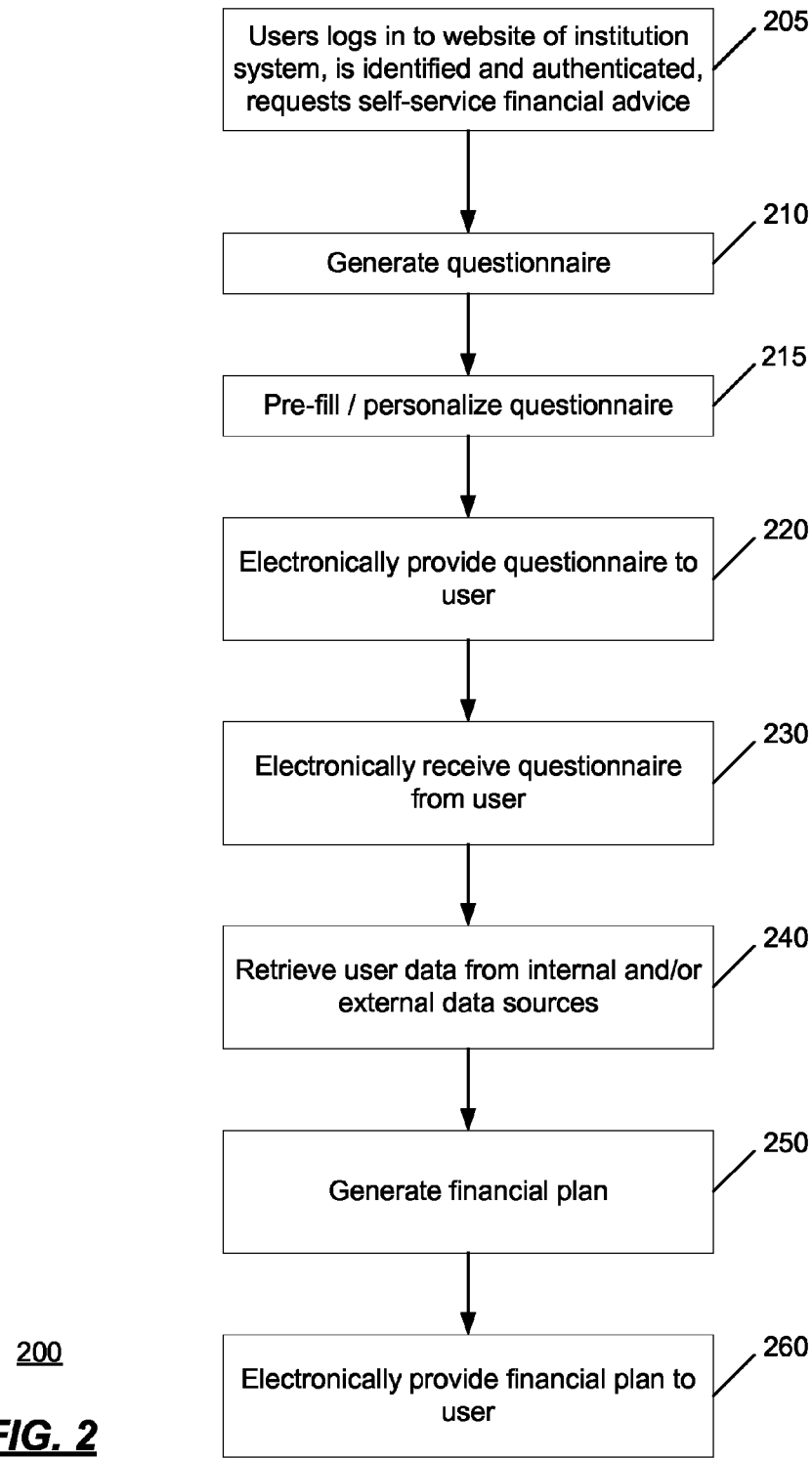
FIG. 2 is an operational flow of an implementation of a method of generating and providing self-service financial advice.

FIG. 2 is an operational flow of an implementation of a method 200 of generating and providing self-service financial advice. At operation 205, a user may log into a website associated with the institution system, may be identified and authenticated using any known techniques, and may request self-service financial advice.

At operation 210, a questionnaire may be generated or retrieved from storage associated with the institution system. The questionnaire may request information from the user that may be analyzed and used to generate a financial plan comprising financial advice and/or recommendations, for example, scenario information, and risk tolerance information. Prior to providing the questionnaire to the user, the questionnaire may be pre-filled or personalized with data that is known to the institution system about the user, such as the user's name, address, and social security number, at operation 215. This information may be retrieved from storage associated with the institution system.

At operation 220, the questionnaire may be electronically provided to the user via the website or email, for example. The user may then fill out the questionnaire, responding to any questions or requests for information contained in the questionnaire, and electronically provide the filled out questionnaire back to the institution system, at operation 230. The user may provide the questionnaire via the website, email, or any other electronic means.

At operation 240, the institution system retrieves the user's personal and financial information from various internal and external data sources. For example, the user may maintain bank accounts, credit cards, loans, and insurance with the institution system, and this information may be retrieved from the institution system's storage. Additional account, asset, liability, and other information may be maintained by one or more entities external to the institution system, and this information may be retrieved as well. In an implementation, as described further herein, the user may provide the institution system with authorization and/or access instructions to access the information from the external data sources.

At operation 250, an analyzer and advice generator associated with the institution system may receive and analyze the information pertaining to the user that was obtained from the questionnaire as well as from the internal and external data sources. The analyzer and advice generator may be an application that receives the information, analyzes the information, and generates a financial plan that is tailored to the user, in one or more of the areas of investment planning, retirement planning, tax planning, estate planning, and risk management, for example. The financial plan, with financial advice and recommendations, may be electronically provided to the user, via a website or email, for example, at operation 260.

Figure 3:
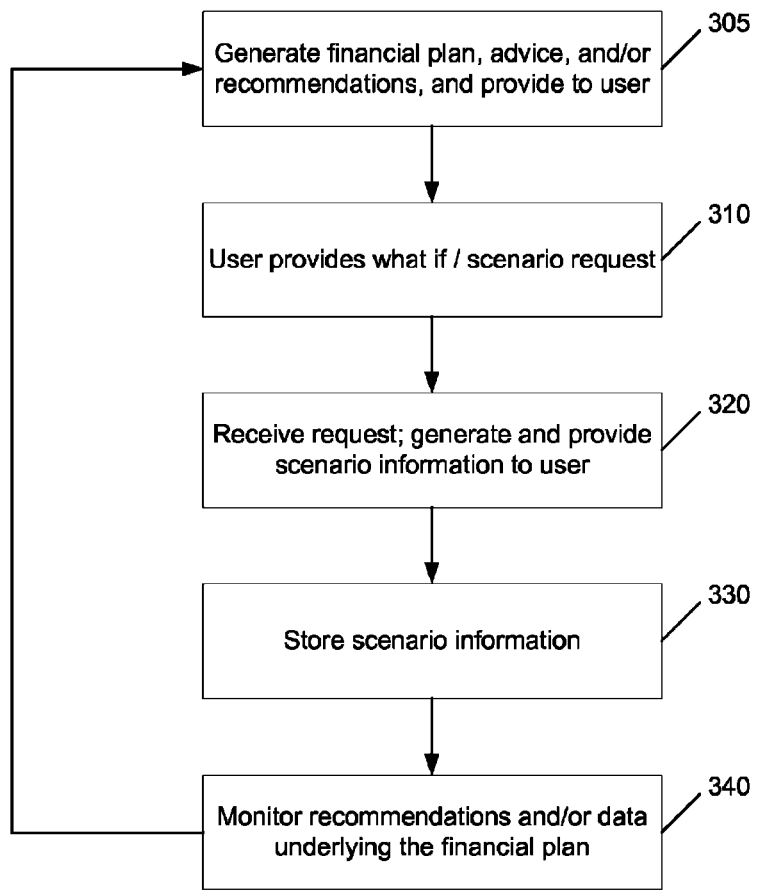
FIG. 3 is an operational flow of another implementation of a method of generating and providing self-service financial advice.

FIG. 3 is an operational flow of another implementation of a method 300 of generating and providing self-service financial advice. At operation 305, a financial plan, advice, and/or recommendations may be generated for a user and provided to the user. At some point, the user may provide a "what if" or scenario request at operation 310. Such a request may include hypothetical information from the user pertaining to various hypothetical or prospective scenarios involving the user, such as various life events (e.g., having a child, getting married, etc.) and financial actions (e.g., paying off credit card debt, retiring at age 60, paying for a child's college education, etc.). Thus, the user may use these features to determine what happens to the financial plan, advice and/or recommendations if the user experiences certain events and/or takes certain actions.

It is contemplated that a user may provide a what if or scenario request online (e.g., via a website accessible from a computing device, such as a personal computer, a personal digital assistant, or mobile phone), or in a telephone virtual menu with touch keypad or voice prompts that may include intelligent voice recognition, for example. Settings and options for the features described herein may be implemented as drop-down lists or radio buttons, for example.

The institution system may receive the request at operation 320, generate scenario information based on the request and the underlying financial plan, and provide the scenario information to the user. The scenario information may include alternative or additional financial advice and/or recommendations, in addition to a revised financial plan. The provided revised financial plan, advice and/or recommendations are based on the hypothetical(s) provided by the user and are not meant to replace the existing financial plan. In an implementation, the scenario information may be stored by the institution system or the user (e.g., on the user computing device) for future reference by the user. At any time, if the user desires additional scenario information, the user may provide another request, with processing continuing at operation 310.

The institution system (e.g., a financial planning engine associated with the institution system) continuously monitors whether any of the recommendations that had been provided to the user are acted on by the user, at operation 340. For example, the institution system may check the internal and external data sources continuously or periodically (e.g., hourly, daily, at a predetermined time and day of the week, etc.) to determine if any action has been taken by the user that is directed to the previously provided recommendations.

The institution system also continuously monitors the user data in the internal and external data sources, at operation 340. For example, a financial planning engine may check the internal and external data sources continuously or periodically (e.g., hourly, daily, at a predetermined time and day of the week, etc.) to determine if any personal or financial data pertaining to the user has been changed since the most recent financial plan had been generated and provided to the user. Thus, life events pertaining to the user may be monitored. For example, the marital status or number of children of the user may change, the user may have a change in job or salary, or may have an increase in assets or liabilities. In an implementation, the institution system may contact the user, via email or telephone for example, and request information from the user regarding any action that the user may have taken pursuant to the financial plan, or any data pertaining to the user that may have changed that may impact the financial plan.

In an implementation, the institution system may provide a financial profile to the user who may update it as they take any action based on the financial plan, if their personal or financial information changes, as their financial goals change, or as the desired probabilities of success of their goals change, for example. The financial profile may be stored in storage that is accessible to the institution system and the institution system may continuously or periodically monitor the financial profile to determine if any recommendations in the financial plan have been acted on, if any data that is pertinent to the financial plan may have changed, or if the financial goals or desired probabilities have changed. The institution system may send a request to the user from time to time, via email or telephone for example, requesting that the user update the financial profile.

If it is determined that a recommendation has been acted on, the data has changed, the goals have changed, or the desired probabilities of success have changed, the financial plan that had been previously generated and provided to the user may be revised, and processing may continue at operation 305. The financial plan, data, goals, and recommendations may be monitored and updated or revised based on the monitoring.

Figure 4:
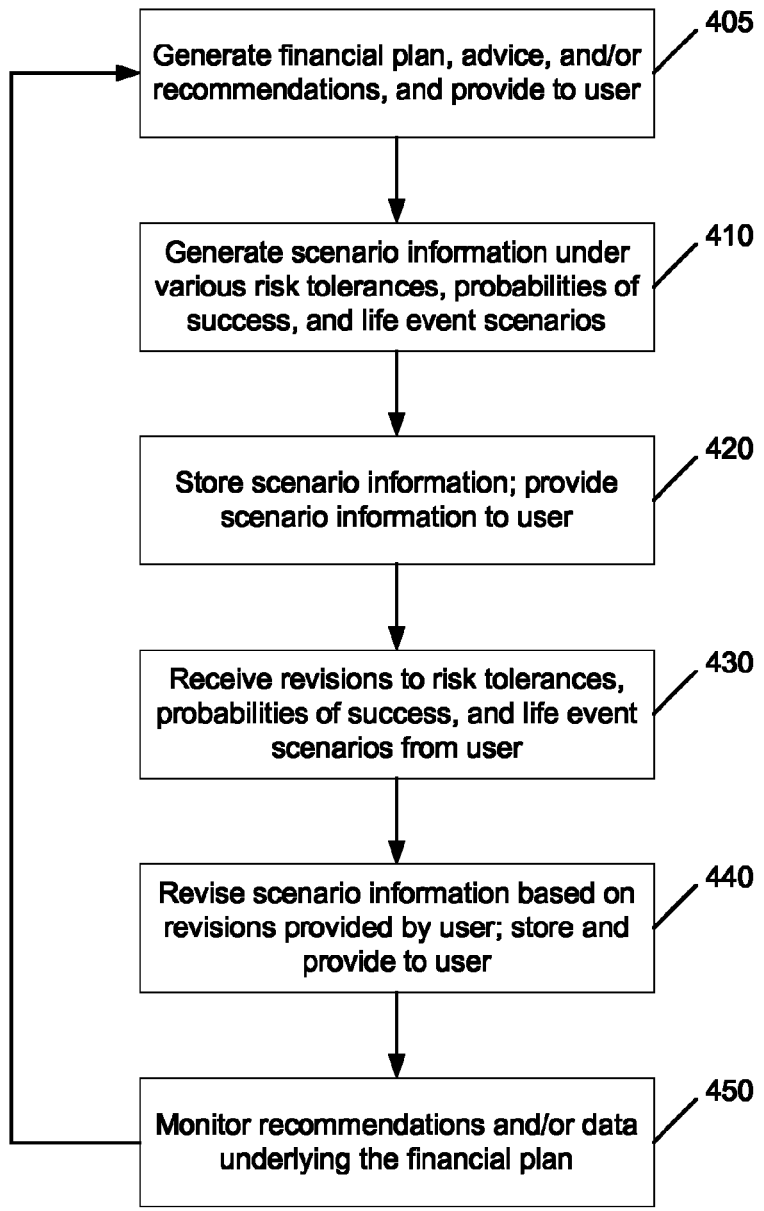
FIG. 4 is an operational flow of another implementation of a method of generating and providing self-service financial advice.

FIG. 4 is an operational flow of another implementation of a method 400 of generating and providing self-service financial advice. At operation 405, a financial plan, advice, and/or recommendations may be generated for a user and provided to the user.

Scenario information may be generated at operation 410. The scenario information may be based on various risk tolerances of the user, various probabilities of success of reaching goals set forth in the financial plan, and/or various life event scenarios, for example. Scenario information may be generated by the institution system periodically or upon user request, for example. The institution system may determine the factors or scenarios under which the scenario information is to be generated, e.g., based on information the institution system may have about the user (e.g., assets, liabilities, life events, age, recent purchases or debt pay-offs, etc.). At operation 420, the scenario information may be provided to the user and stored.

At some point, at operation 430, the user may provide revisions to the underlying data (e.g., the "what ifs", the hypotheticals, etc.) that is used in determining the scenario information. Such revisions may include changes to risk tolerances, probabilities of success, or life event scenarios, for example. The user may provide the revisions to the institution system, e.g., via a website or email, where they are received and processed. At operation 440, the scenario information may be revised based on the revisions to the underlying data provided by the user. The revised scenario information may be stored and provided to the user.

As described above with respect to the method 300, the institution system continuously monitors whether any of the recommendations that had been provided to the user are acted on by the user. Such monitoring may be performed at operation 450, along with a continuous monitoring of the user data in the internal and external data sources. If it is determined that a recommendation has been acted on, the data has changed, the goals have changed, or the desired probabilities of success have changed, the financial plan that had been previously generated and provided to the user may be revised, and processing may continue at operation 405. The financial plan, data, goals, and recommendations may be monitored and updated or revised based on the monitoring.

Figure 5:
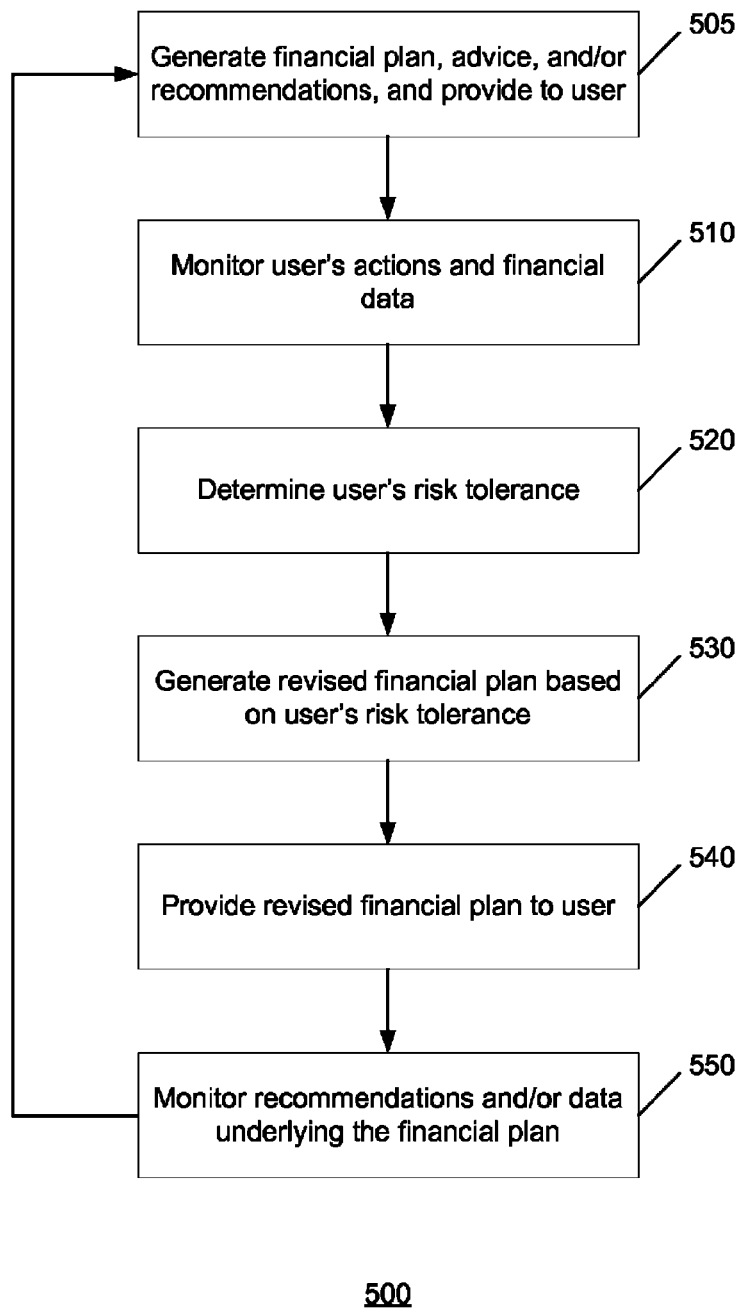
FIG. 5 is an operational flow of an implementation of a method of monitoring user behavior with respect to financial planning.

FIG. 5 is an operational flow of an implementation of a method 500 of monitoring user behavior with respect to financial planning. At operation 505, a financial plan, advice, and/or recommendations may be generated for a user and provided to the user.

At operation 510, the user's actions and the data pertaining to the user that underlies the financial plan may be monitored over time with respect to various financial data, such as financial market data, movement and/or fluctuations, changes in interest rates, changes in inflation rates, etc. The institution system may analyze the data received from the monitoring, at operation 520, and determine the user's risk tolerance. For example, the user's financial actions during a stock market correction, a period of rising interest rates, a period of inflation, etc. may provide an indication as to the user's tolerance for risk. The user may be advised of the determined risk tolerance.

At operation 530, a revised financial plan may be generated based on the original financial plan and the determined user's risk tolerance. The revised financial plan may be provided to the user at operation 540, via a website or email, for example. In an implementation, both the original financial plan and the revised financial plan may be provided to the user for comparison. The user may wish to implement one of the financial plans, for example, and may provide such a selection or indication to the institution system. Both the original financial plan and the revised financial plan may be stored for future reference, by the user and/or the institution system.

As described above, the institution system continuously monitors whether any of the recommendations that had been provided to the user are acted on by the user. Such monitoring may be performed at operation 550, along with a continuous monitoring of the user data in the internal and external data sources. If it is determined that a change has occurred or a recommendation has been acted on, the financial plan that had been previously generated and provided to the user may be revised, and processing may continue at operation 505.

Exemplary Computing Arrangement

Figure 6:
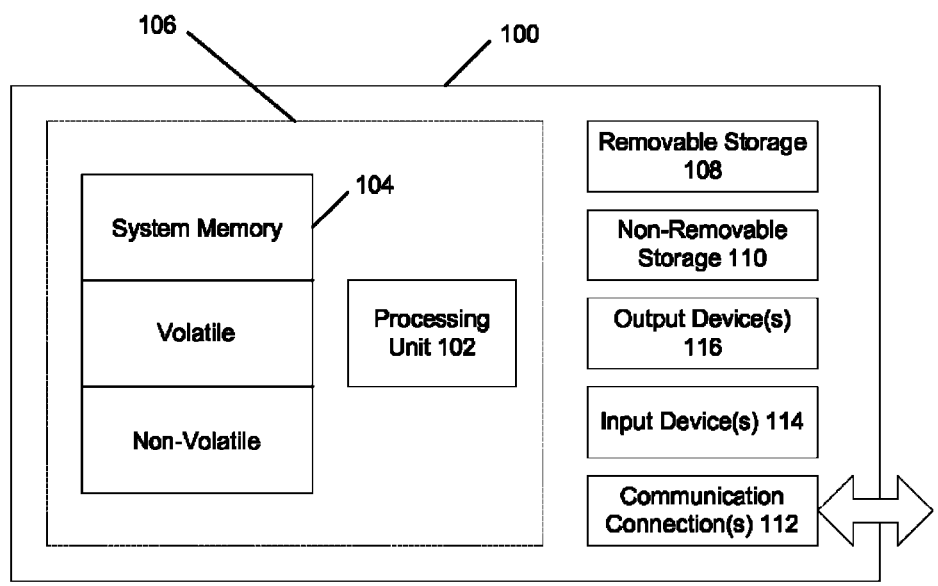
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A financial planning method, comprising:
   retrieving user data related to a user;
   generating a financial plan comprising recommendations for the user using a computer-implemented self-service financial planner of an institution;
   providing the financial plan to a user computing device of the user from the computer-implemented self-service financial planner via a network;
   monitoring, using a processor, the user's actions related to implementation of the recommendations in the financial plan and financial data over a selected period of time;
   continuously monitoring whether any of the user data has changed;
   determining, using the processor, the user's risk tolerance by analyzing the user's actions related to implementation of the recommendations in the financial plan in view of the financial data and;
   generating a revised financial plan so that the revised financial plan is aligned with the user's risk tolerance determined by the processor and changes to the user data; and
   providing the revised financial plan to the user.

2. The method of claim 1, wherein the financial plan is a self-service real-time financial plan.

3. The method of claim 1, wherein the user data is retrieved from a plurality of data sources comprising an internal data source internal to the institution and a plurality of external data sources, each external data source being external to the institution.

4. The method of claim 1, further comprising:
   after generating the revised financial plan, providing both the financial plan and the revised financial plan to the user for comparison.

5. The method of claim 1, further comprising:
   receiving, from the user, an indication of which one of the financial plan or the revised financial plan that the user wishes to implement.

6. The method of claim 1 wherein the financial data includes financial market data, movement or fluctuation of the financial market data, changes in interest rates, and changes in inflation rates.

7. A non-transitory computer-readable medium comprising computer-readable instructions for financial planning, said computer-readable instructions comprising instructions that:
   retrieve user data related to a user;
   generate a financial plan comprising recommendations for the user using a computer-implemented self-service financial planner of an institution;
   provide the financial plan to a user computing device of the user from the computer-implemented self-service financial planner via a network;
   monitor, using a processor, the user's actions related to implementation of the recommendations in the financial plan and financial data over a selected period of time;

continuously monitor whether any of the user data has changed;

determine, using the processor, the user's risk tolerance by analyzing the user's actions related to implementation of the recommendations in the financial plan in view of the financial data and changes to the user data;

generating a revised financial plan so that the revised financial plan is aligned with the user's risk tolerance determined by the processor; and provide the revised financial plan to the user.

8. The non-transitory computer-readable medium of claim 7, wherein the financial plan is a self-service real-time financial plan.

9. The non-transitory computer-readable medium of claim 7, wherein the user data is retrieved from a plurality of data sources comprising an internal data source internal to the institution and a plurality of external data sources, each external data source being external to the institution.

10. The non-transitory computer-readable medium of claim 7, further comprising instructions that provide both the financial plan and the revised financial plan to the user for comparison after generating the revised financial plan.

11. The non-transitory computer-readable medium of claim 7, further comprising instructions that receive, from the user, an indication of which one of the financial plan or the revised financial plan the user wishes to implement.

12. The non-transitory computer-readable medium of claim 7 wherein the financial data includes financial market data, movement or fluctuation of the financial market data, changes in interest rates, and changes in inflation rates.

13. A financial planning system, comprising:

a processor;

a non-transitory computer-readable medium coupled to the processor and storing a plurality of instructions, which, when executed, cause the processor to provide financial planning, the plurality of instructions comprising:

instructions that cause the processor to retrieve user data related to a user;

instructions that cause the processor to generate a financial plan comprising recommendations for the user using a computer-implemented self-service financial planner of an institution;

instructions that cause the processor to provide the financial plan to a user computing device of the user from the computer-implemented self-service financial planner via a network;

instructions that cause the processor to monitor the user's actions related to implementation of the recommendations in the financial plan and financial data over a selected period of time;

instructions that cause the processor to determine the user's risk tolerance by analyzing the user's actions related to implementation of the recommendations in the financial plan in view of the financial data;

instructions that cause the processor to continuously monitor whether any of the user data has changed;

instructions that cause the processor to generate a revised financial plan so that the revised financial plan is aligned with the user's risk tolerance determined by the processor and changes to the user data; and instructions that cause the processor to provide the revised financial plan to the user.

14. The system of claim 13, wherein the financial plan is a self-service real-time financial plan.

15. The system of claim 13, wherein the user data is retrieved from a plurality of data sources comprising an internal data source internal to the institution and a plurality of external data sources, each external data source being external to the institution.

16. The system of claim 13, further comprising instructions that receive, from the user, an indication of which one of the financial plan or the revised financial plan the user wishes to implement.

17. The system of claim 13 wherein the financial data includes financial market data, movement or fluctuation of the financial market data, changes in interest rates, and changes in inflation rates.

\* \* \* \* \*